March 18, 1941.  C. J. RASMUSSEN  2,234,980
RADIO LOCATION FINDER
Filed Aug. 3, 1938  3 Sheets-Sheet 1
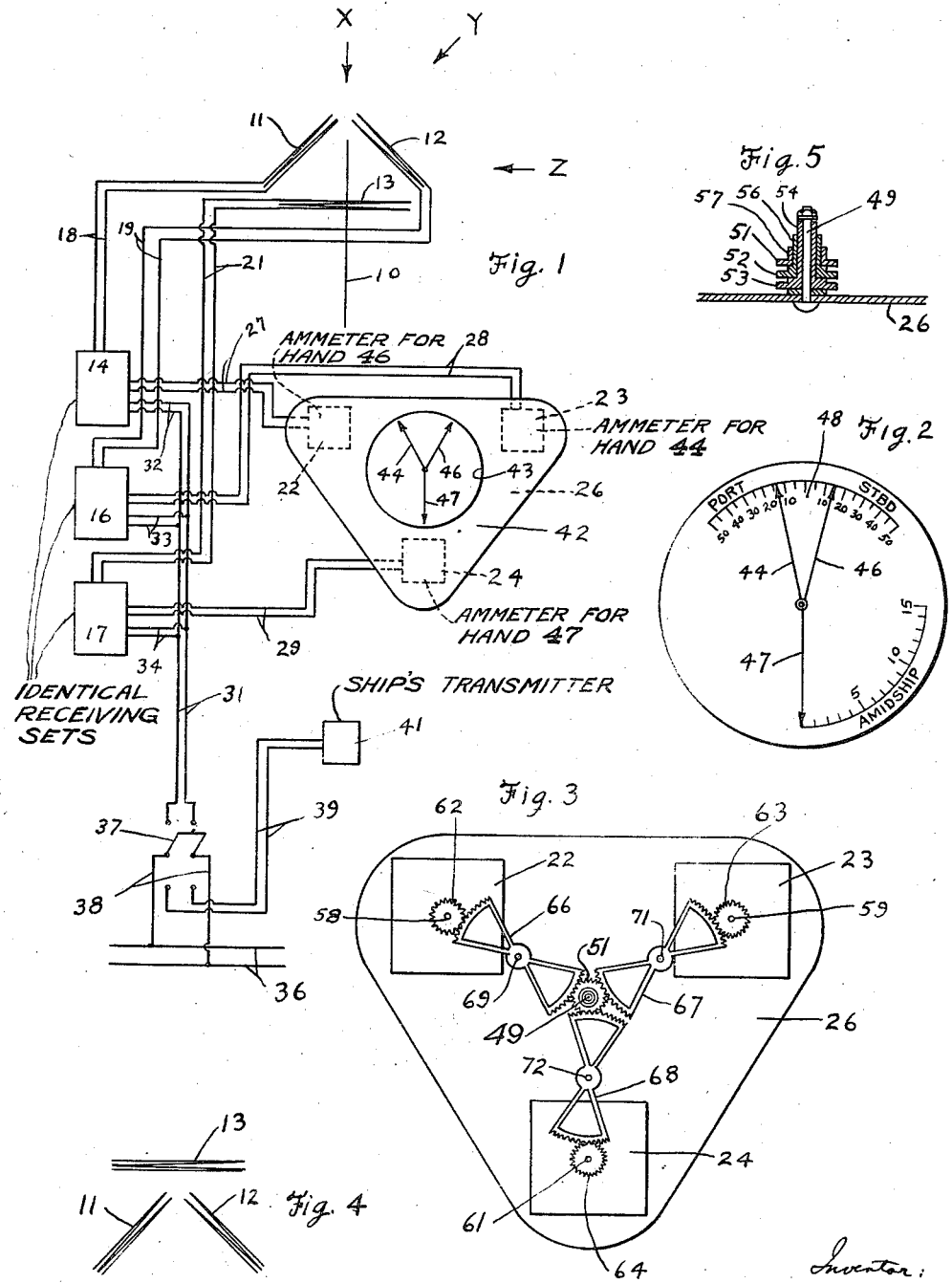

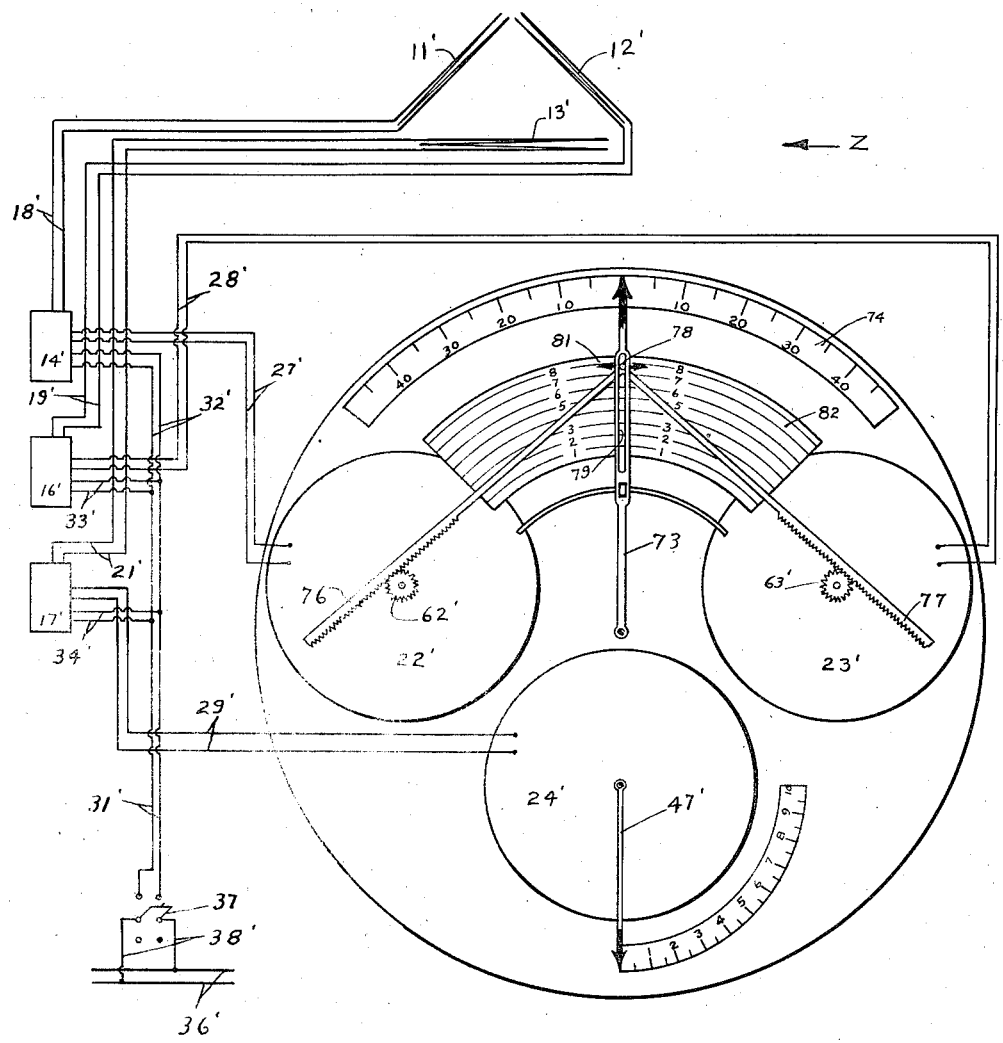

March 18, 1941.   C. J. RASMUSSEN   2,234,980
RADIO LOCATION FINDER
Filed Aug. 3, 1938   3 Sheets-Sheet 3
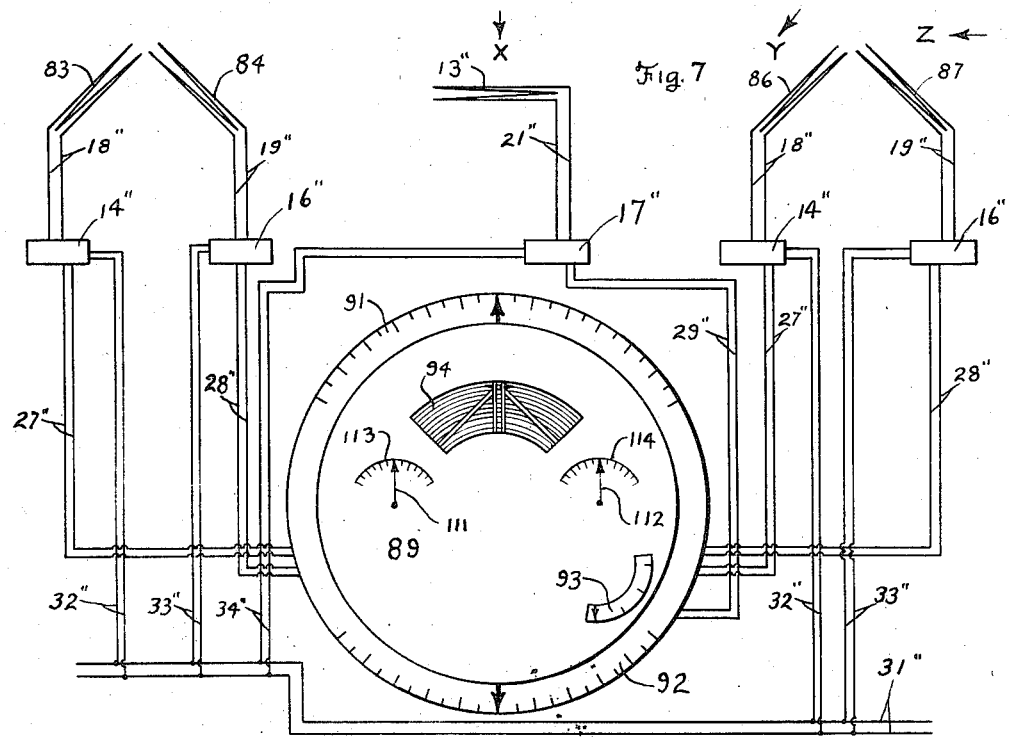
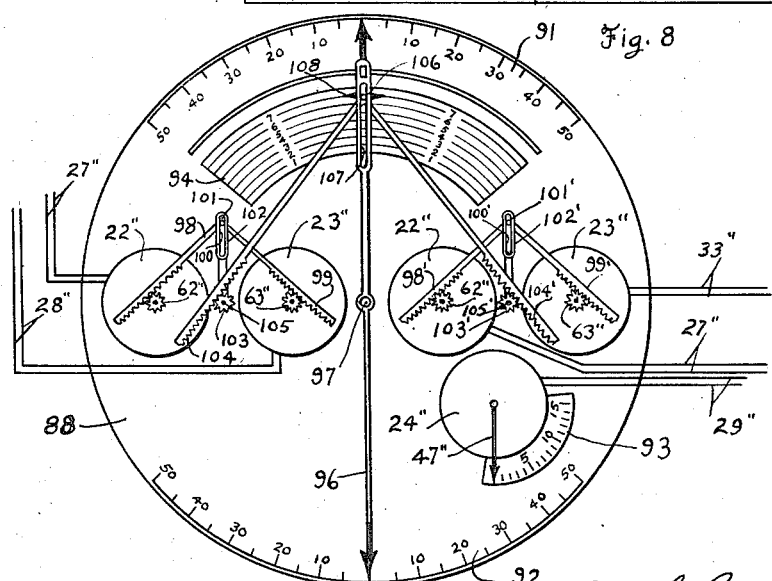
Inventor
Carl J. Rasmussen
By J. Motherhead
Attorney Patented Mar. 18, 1941

2,234,980

UNITED STATES PATENT OFFICE 2,234,980

RADIO LOCATION FINDER

Carl J. Rasmussen, Washington, D. C.

Application August 3, 1938, Serial No. 222,837

12 Claims. (Cl. 250—11)

(Granted under the act of March 3, 1883, as amended April 30, 1928; 370 O. G. 757)

This invention relates to a radio location finder for use on ships such as air craft, ocean going vessels and the like. The purposes of the invention are to provide for determining the direction from which signals are received, whether signals are being received from more than one station simultaneously, and also for indicating the distance to the source or transmitting station from which signals are received.

The invention provides for attaining these desirable objectives by using directional antennae, one of which may have its line of maximum receptivity disposed transversely of the course of the ship, as for example, transversely of the keel line of a boat, while the other antennae may be arranged with their lines of maximum receptivity angularly disposed with respect to each other and extending in different directions with respect to the course of the ship, as for instance to port and to starboard, respectively. The latter antennae may be utilized effectively for determining the direction of a sending station in a considerable sector ahead or astern of the ship, but these antennae may also give the same indication for a signal received from a station ahead or astern of the ship as for a signal received from a station abeam of the ship, that is from a station in a general direction approximately at right angles to the course of the ship.

A feature of this invention resides in the arrangement of directional antennae with suitable indicators for determining the direction of a transmitting station ahead or astern of the ship in combination with a directional antenna having its line of maximum receptivity disposed transversely of the ship. As the latter antenna has its line of minimum receptivity running ahead and astern of the ship, it is merely necessary to observe the strength of the signals received on this antenna to determine whether the sending station is off the beam, and if not, then the other antennae may be depended upon to indicate reliably the direction of the sending station. This arrangement also makes it possible to determine whether signals are being received simultaneously from stations at different points of the compass.

Another important feature resides in the means for indicating the distance to the sending station. Information from reliable sources indicates that over sixteen hundred ships on the high seas are now equipped with sets for transmitting signals over the same wave band at the same strength, and compliance with regulations now in force may, and in all probability will result in a substantial increase in the number of ships so equipped. The strength of signals received from these ships may be utilized to indicate distance on a chart or a calibration. In accordance with this invention this may be accomplished by causing an indicator to move over a chart or calibration in response to impulses proportional to the strength of signals received on two or more directional antennae. The invention also makes it possible to determine mathematically the actual distance to stations transmitting signals at different strengths over different wave bands, and also provides for indicating the actual distances to such stations.

The features of the invention are illustrated in the accompanying drawings, wherein:

Fig. 1 is a diagrammatic view of a receiving set in accordance with this invention;

Fig. 2 is a plan view of the dial of the indicating device shown in Fig. 1;

Fig. 3 is a plan view of the indicating device of Fig. 1 with its cover removed to illustrate details of construction;

Fig. 4 is a plan view illustrating a different arrangement of the directional antennae shown in Fig. 1;

Fig. 5 is a sectional view illustrating a detail of construction;

Fig. 6 is a plan view of another embodiment of this invention, illustrating an indicating device with its cover removed;

Fig. 7 is a view, largely diagrammatic in character, of another embodiment of this invention, illustrating the indicating device in plan; and Fig. 8 is a plan view of the indicating device shown in Fig. 7 with its cover removed to illustrate its interior construction.

The embodiment selected for illustration in Figs. 1, 2, 3 and 5 comprises directional antennae 11 and 12 arranged with their lines of maximum receptivity angularly disposed with respect to each other and with respect to the longitudinal center line 10 of a ship of the class described, as the keel line of a boat. Preferably, these antennae are also oppositely disposed at substantially similar angles with respect to this longitudinal center line or keel line, but of course this is not necessary as will be appreciated by those familiar with this art. A directional antenna 13 is arranged with its line of maximum receptivity disposed transversely of and preferably substantially at right angles to the longitudinal center line or keel line 10.

Receiving and amplifying sets 14, 16 and 17 may be connected individually to the antennae 11, 12 and 13 by circuits 18, 19 and 21, respectively. It will be understood that these receiving and amplifying sets as well as the antenna and the connecting circuit associated with each receiving and amplifying set have the same characteristics so that equal input voltages may be amplified to produce equal output voltages in each set and the amplifying power in each of these sets is identical. Likewise, identical current meters 22, 23 and 24 of the rotary spindle type may be mounted in a suitable frame 26 and connected respectively to the sets 14, 16 and 17 by the circuits 27, 28 and 29. Each of the sets 14, 16 and 17 may be individually connected to a circuit 31 by circuits 32, 33 and 34, respectively. The circuit 31 may be connected to the line 36 through a double pole, double throw switch 37 and a circuit 38. This switch may also be adapted to connect the line 36 through the circuit 38 with a circuit 39 leading to the ship's transmitter indicated generally by the reference character 41.

The frame 26 carrying the current meters 22, 23 and 24 may be provided with a removable cover 42 having a dial opening 43 to expose indicating hands or pointers 44, 46 and 47 which are movable over a graduated dial 48 (Fig. 2).

Mounted on the frame 26 and disposed preferably coaxially with the dial opening 43 there is stub shaft 49 (Fig. 5) which rotatably supports pinions 51, 52 and 53. The pinion 53 may have a comparatively long sleeve bearing 54 mounted directly on this stub shaft, while the pinion 52 may have a shorter sleeve bearing 56 rotatably mounted on the sleeve bearing 54, and the pinion 51 may have a still shorter sleeve bearing 57 rotatably mounted on the sleeve bearing 56, the arrangement being such that the innermost sleeve bearing 54 projects beyond the others so that the indicating hand 47 may be fixedly mounted on the outer end thereof, and similarly the indicating hand 44 may be fixedly mounted on the projecting end of the sleeve bearing 56, and the indicating hand 46 may be fixedly mounted on the sleeve bearing 57. The rotary spindles 58, 59 and 61, of the current meters 22, 23 and 24, respectively, have fixedly mounted thereon the pinions 62, 63 and 64, respectively. Motion may be transmitted from the current meters through the pinions 62, 63 and 64 thereof to operate the indicating hands 44, 46 and 47 by means of sector gears 66, 67 and 68 interposed between these pinions and the pinions 51, 52 and 53. These sector gears may be rotatably mounted on stub shafts 69, 71 and 72 carried by the frame. Thus, the sector gear 66 may engage the pinion 62 and the pinion 52 which carries the indicating hand 44, the sector gear 67 may engage the pinion 63 and the pinion 51 which carries the operating hand 46, and the sector gear 68 may engage the pinion 64 and the pinion 53 which carries the indicating hand 47. The dial 48, over which these indicating hands are adapted to swing, may be graduated in degrees to port, starboard and amidship, as shown.

It will be seen from the connections just described that the hand 44 is responsive to the intensity of signals received by the antenna 12, while the hand 46 is responsive to the intensity of signals received by the antenna 11 and, of course, the hand 47 is responsive to the intensity of signals received by the antenna 13. Preferably the hands 44 and 46 are arranged to lie in superposed relation along the vertical center line of the dial 48, when indicating zero readings, and the current meters 22 and 23 are so arranged that the current meter 22, acting through the mechanical connections, swings the hand 46 clockwise or to starboard in response to the intensity of signals received by the antenna 11, while the current meter 23 acts through the mechanical connections associated therewith to swing the hand 44 counter-clockwise or to port in response to the intensity of signals received by the antennae 12. It will be evident from the foregoing that the one of the hands 44 or 46 which swings from its zero reading through the greater arc in response to the intensity of a received signal, will indicate whether the signal is received from port or from starboard. For instance, if the hand 46 swings through a greater arc than hand 44, this will inform an observer that the sending station is to starboard. In a like manner, if the hand 44 swings through the greater arc, this will inform the observer that the sending station is to port. If the hands 44 and 46 swing through equal arcs, the sending station is directly ahead.

In the embodiment shown in Fig. 6, the directional antennae, the receiving and amplifying sets, the current meters and the circuits associated with the foregoing may be identical in construction and arrangement with corresponding parts in the embodiment previously described herein, and therefore, the same reference characters bearing prime marks are used to designate these parts in Fig. 6. The indicating device of Fig. 6 differs from that previously described in that only the current meters 22' and 23' are equipped with pinions 62' and 63' respectively, while the indicating hand 47' is connected directly to the rotary spindle (not shown) of the current meter 24'. This indicating device has a differential indicator comprising an indicating hand or pointer 73 pivotally mounted on the frame to swing over a scale 74 which may be graduated to represent degrees to port or to starboard. This pointer may be actuated from the current meters 22' and 23' by means of racks 76 and 77 engaging the pinions 62' and 63' respectively. Preferably, the adjacent ends of these racks are pivotally connected as by means of a pivot pin 78 adapted to ride in a slot 79 in the indicator hand 73 and to carry an indicator 81 over a calibration or chart 82.

The embodiment illustrated in Figs. 7 and 8 is similar to previously described embodiments in having a plurality of directional antennae, each of which is individually connected through identical receiving and amplifying sets to identical current meters. As shown in Fig. 7, a directional antenna 13'', a receiving and amplifying set 17'', a current meter 24'', and the circuits associated with these parts may be identical with those shown in Fig. 1, with the single exception that the current meter 24'' is not equipped with a gear 64 as shown in Fig. 1, but this current meter does carry an indicating hand 47'' as described with reference to Fig. 6. The other directional antennae 83, 84 and 86, 87, of Fig. 7 preferably are arranged in pairs adapted to be disposed symmetrically on opposite sides of the longitudinal center line or keel line of a ship so as to provide for greater sensitivity. For convenience, the antennae 83 and 84 may be referred to hereinafter as the port side pair or merely as the port pair or port antennae, and similarly the antennae 86 and 87 may be referred to as the starboard pair or merely as the starboard antennae. Both the port and the starboard antennae may be arranged and connected through receiving and amplifying sets 14" and 16" to current meters 22" and 23" in the same manner as described herein with reference to the antennae 11 and 12 of Fig. 1. Therefore those parts shown in Figs. 7 and 8 which correspond with like parts in Fig. 1 are given the same reference characters bearing double prime marks.

The indicating device of Figs. 7 and 8 may comprise a frame or back plate 88 and a removable front or cover 89 having suitable openings therein to expose the peripheral scales or graduations 91 and 92, the scale 93 and the calibration or graph 94. An indicator or double pointer 96 of the differential type may be mounted on a pivot post 97 to extend substantially across the indicating device along a diameter thereof so as to be capable of swinging over the scales 91 and 92. Motion may be transmitted from the port current meters to the indicator 96 by means of racks 98 and 99 engaging the pinions 62" and 63", respectively, and having their adjacent ends pivotally connected by a pin 101 which rides in a slot 100 in an arm 102 to the lower end of which a pinion 103 may be fixedly secured in coaxial relation with a stub shaft 105 mounted on the frame and rotatably supporting the lower end of arm 102. A rack 104 engages the pinion 103 and extends to the indicator 96. In a like manner, motion may be transmitted from the starboard current meters to the indicator 96 by means of racks 98' and 99' engaging the pinions 62" and 63", respectively, and having their adjacent ends pivotally connected by a pin 101' which also rides in a slot 100' in an arm 102' to the lower end of which a pinion 103' may be fixedly secured in coaxial relation with a stub shaft 105' mounted on the frame and rotatably supporting the lower end of the arm 102'. A rack 104' engages the pinion 103' and extends to the indicator 96 where the adjacent ends of the racks 104 and 104' may be pivotally connected by means of a pin 106 which is adapted to ride in a slot 107 in the indicator and to carry a double arrow head indicator 108 over the calibration or graph 94.

The direction from which signals are received by the port antennae may be indicated conveniently by an indicator hand 111 (Fig. 7) mounted on and coaxially with the pinion 103. This hand preferably is mounted in fixed relation with the pivotal arm 102 so that the hand always extends in the same direction as the arm. In a like manner, an indicating hand 112 may be mounted on pinion 103' in fixed relation with the arm 102', so that this hand always extends in the same direction as arm 102'. The hand 111 is adapted to swing over a scale 113 in both directions from a centrally disposed zero reading and, likewise, the hand 112 is adapted to swing over a scale 114 in both directions from a centrally disposed zero reading.

In the embodiment illustrated in Figs. 1, 2, 3 and 5, it is preferred to have the indicating hand 47 arranged to lie along the vertical center line of the dial 48, as shown, when indicating a zero reading. In using this embodiment it will be understood that the indicating device and the receiving and amplifying equipment as well as the antennae may be located at any convenient point or points, but preferably the antennae 11 and 12 are angularly disposed with respect to each other and oppositely disposed at substantially similar angles with respect to the longitudinal center line 10 of the ship. It will also be understood that the antennae may be arranged as shown in Fig. 4, if desired, or in other ways, as will be understood by those skilled in this art when informed by this specification.

When the switch 37 is closed to complete the circuit from the line 36 to the circuit 31 and the receiving and amplifying sets are adjusted in a manner well known in this art to give like amplification for each antenna, the device will be effective for indicating the direction from which signals are received. For instance, if waves from a transmitting station approach the antennae in Fig. 1 in the direction indicated by the arrow x, which is at equal angles to the antennae 11 and 12 and at right angles to the antenna 13, the amounts of energy absorbed by the antennae 11 and 12 will be substantially equal, and as these signal impulses are amplified equally in the receiving and amplifying sets 14 and 16, the current meters 22 and 23 each receive the same current and therefore the pinions 62 and 63 turn through identical arcs. This motion of the pinions 62 and 63 is transmitted, as previously described, through the sector gears 66 and 67 to the pinions 52 and 51, which swing the hands 44 and 46 in opposite directions and through equal arcs to some position such as that illustrated in Fig. 1 or in Fig. 2. As this signal was received along the line of minimum receptivity of the antenna 13, substantially no energy was absorbed by this antenna and hand 47 remains in its zero position. By observing the indicating device and noting that the hands 44 and 46 were equally deflected while the hand 47 remained in its zero position, an attendant would be informed that the signal was received from a ship or at least from a station directly ahead.

If waves approach the antennae in the direction indicated by the arrow y in Fig. 1, or along the line of maximum receptivity of the antenna 11 and at substantially right angles to the antenna 12, it will be understood that the reception of the latter will be a minimum, the hand 44 will remain at its zero position, the hand 46 will swing to the right, and as some of the signal energy is absorbed by the antenna 13 and amplified by the unit 17, the current meter 24 will rotate its pinion 64 through an arc, thereby swinging the sector gear 68, pinion 53 and the hand 47 through a smaller arc than that traversed by the hand 46. This position of the indicating hands informs the operator of the direction from which the signal was received.

If waves approach the antennae in the direction indicated by the arrow z, equal amounts of signal energy would be absorbed by the antennae 11 and 12 and the hands 44 and 46 would traverse equal arcs. This reading alone would be insufficient to inform an observer whether the signal was received from a ship or station directly ahead or off the beam. However, as these waves were received by the antenna 13 along its line of maximum receptivity, the hand 47 will be caused to swing through a considerably greater arc than that traversed by either of the hands 44 or 46, and this at once informs the operator that the signal was received from a ship or station off the beam. It will also be evident from the foregoing that if signals should be received simultaneously from two stations, both of which are not in alignment with the longitudinal center line of the ship, the reception of energy would be such as to cause the hands 44, 46 and 47 to swing through arcs which would inform the observer of the fact that two signals had been received simultaneously. It will also be understood that if waves transmitted from a ship, an aeroplane, or other station, are received from directions intermediate of those indicated, the interception of such waves by the antennae 11, 12 and 13 will cause corresponding deflection of the hands 44, 46 and 47, by comparison of which the direction of the sending station can be readily ascertained. It is of course well known in this art that a signal received from ahead may give the same reading as a signal received from astern, and that the direction from which the signal is actually received can be readily ascertained by using a vertical antenna in connection with the system and introducing the capacity of the earth into one side of the set input in a manner known as the "cardioid" effect. The introduction of the capacity on the side away from the sending station is effective to substantially cut out the incoming signal.

In using the device shown in Fig. 6, the antennae, receiving and amplifying sets, current meters and circuits function substantially as described with reference to Fig. 1. Energy received by the antenna 13' is amplified and indicated by the hand 47'. It will also be seen that when equal amounts of energy are received by the antennae 11' and 12', the current meters 22' and 23' will rotate their pinions 62' and 63' in opposite directions through equal arcs and cause the racks 76 and 77 to travel upwardly equal distances, thereby moving the pin 78 along the slot 79 of the indicator 73 without moving the latter from its zero position. As the pin 78 travels along the slot 79, it carries with it the double arrowhead indicator 81. The chart or calibration 82, over which the indicator 81 travels, may be prepared for use when receiving signals from any particular station or group of stations transmitting signals over the same wave band at the same strength. The numerals on the chart may represent actual distance, or they may be used in connection with tables prepared for indicating the distance from which signals are received. It will be understood that signals received from a station nearby will cause the current meters to rotate the pinions 62' and 63' through greater arcs and thereby cause the indicator 81 to traverse a greater portion of the chart 82 than will be the case with signals received from a distant station. In this way it is possible to make a close approximation to the actual distance to the sending station. It will also be seen that when different amounts of energy are received by the antennae 11' and 12', the current meters 22' and 23' will turn their pinions through unequal arcs, thereby moving one of the racks more than the other and causing the indicator to swing in one direction or the other over the scale 74 which may be marked off to show degrees to port or starboard of the sending station, or it may be marked in numerals which are to be referred to prepared tables to show the actual direction of the sending station.

In using the embodiment shown in Figs. 7 and 8, the radio and electrical equipment functions as previously described herein and energy received by the antenna 13'' causes the indicating hand 47'' to swing over the scale 93 associated therewith as described with reference to Fig. 6. It is contemplated that the port and starboard antennae may be located at opposite ends of the bridge of a boat or on opposite wings of an aeroplane. When this is done, a signal received by the port antennae will cause the current meters associated therewith to turn their pinions and thereby move the racks 98 and 99 a slightly different distance from that in which the racks 98' and 99' are moved by the current meters associated with the starboard antennae in response to the energy received by the starboard antennae from the same signal.

It will be seen that each of the arms 102 and 102' (Fig. 8) functions in the same manner as the indicator 73 described herein with reference to Fig. 6. Therefore the hand 111 which is connected to the arm 102 will indicate the actual direction from which signals are received by the port antennae, while the hand 112 will indicate the actual direction from which signals are received by the starboard antennae. Since the actual distance between the port and starboard antennae is known, this distance may be taken as the base of a triangle. The angles adjacent this known side of the triangle are shown by the positions of the indicating hands 111 and 112. As one side and the adjacent angles of this triangle are known, solving the triangle by trigonometry will give the actual distance to the source or sending station from which the signals were received. This distance is indicated automatically on the chart 94 by the double arrowhead indicator 108 as explained with reference to the similar indicator 81 in Fig. 6.

It will also be seen that as the racks 98, 99 and 98' and 99' are moved by the current meters, the arms 102 and 102' will in most instances be swung in one direction or the other. This imparts a rotary movement to the pinions 103 and 103' either in the same or in opposite directions. This movement of the pinions causes the racks 104 and 104' to swing the indicator clockwise or counter-clockwise to a position indicating the actual direction from which the signals were received. If the pinions 103 and 103' are both turned through equal arcs in opposite directions, the racks 104 and 104' will be moved equally and the pin 106 will ride along the slot 107 without moving the indicator 96 from the position shown in Figs. 7 and 8, and, as previously explained herein, this will inform an observer that the signals were received from a station directly ahead. The distance to such station will be indicated on the chart 94 by the double arrowhead indicator 108.

This invention may be used advantageously on ocean-going vessels and other water craft, as well as on aircraft. The term "ship" is used herein and in the claims in its broad sense and is intended to include all types of aircraft, as well as all types of water craft. When the invention is used on an aeroplane, for example, it is well adapted for enabling the pilot to follow a radio beam or a fog signal. Thus, when the hands 44 and 46 of Fig. 1 are equally deflected, or the indicator 73 of Fig. 6 or the indicator 96 of Figs. 7 and 8 points directly ahead, the pilot is thereby informed that he is on his course, and if different indications are given, the pilot is thereby informed of his position and may readily correct his course. When the sending station is located at a landing field, the indicator hands 47, 47' or 47'' may be used to facilitate landing. When the plane is approaching the field these indicator hands will remain at their zero positions, but when the plane is over or nearly over the field any one of these hands will swing through its maximum amplitude, thus informing the pilot of his position. When used for this purpose, each of the hands 47, 47' and 47" of the different illustrated embodiments may be arranged to swing over the same scales in the opposite direction herein, so that if the dial of the instrument is mounted vertically, each of these hands will point vertically downward when the plane is over the landing field.

The invention described herein, if patented, may be manufactured and used by or for the Government for governmental purposes without the payment to me of any royalty thereon.

It should be understood that the present disclosure is for the purpose of illustration only, and that this invention includes all modifications and equivalents which are within the scope of the appended claims.

What I claim is:

1. A radio location finder for a ship or the like, comprising a plurality of directional antennae, some of these antennae being arranged with their lines of maximum receptivity angularly disposed with respect to each other and obliquely disposed with respect to the longitudinal center line of the ship, one of said antennae having its line of maximum receptivity disposed approximately at right angles to the keel line of the ship, and means responsive to the intensity of signals received by said antennae for indicating the source of said signals, the latter means comprising an indicator responsive to the intensity of signals received by said one of said antennae, a differential indicator comprising a movable indicating hand and differential means responsive differentially to the intensity of signals received by said some of said antennae for moving said indicating hand, a calibration adjacent said differential indicator, and means movable with and transversely relative to the direction of motion of said indicating hand in response to said differential means for indicating on said calibration the distance to the source of said signals.

2. A radio location finder for a ship or the like, comprising a plurality of directional antennae, one of said antennae having its line of maximum receptivity disposed approximately at right angles to the longitudinal center line of the ship, some of said antennae being arranged in pairs spaced transversely of the ship with the lines of maximum receptivity of the antennae of each pair angularly disposed with respect to each other, and means responsive to the intensity of signals received by said antennae for indicating the source of said signals, the latter means comprising an indicator responsive to the itnensity of signals received by said one of said antennae and a differential means associated with each of said pairs of antennae and differentially responsive to the intensity of signals received thereby, and a differential indicator responsive to the differential means associated with said pairs of antennae.

3. A radio location finder for a ship or the like, comprising a plurality of directional antennae, one of said antennae having its line of maximum receptivity disposed approximately at right angles to the longitudinal center line of the ship, some of said antennae being arranged in pairs spaced transversely of the ship with the lines of maximum receptivity of the antennae of each pair angularly disposed with respect to each other, and means responsive to the intensity of signals received by said antennae for indicating the source of said signals, the latter means comprising an indicator responsive solely to the intensity of signals received by said one of said antennae, and a differential indicator hand differentially movable in response to the intensity of signals received by said some of said antennae, a calibration adjacent said differential indicator hand, and means movable along said differential indicator hand and transversely of the direction of motion thereof in response to the intensity of the latter signals for indicating on said calibration the distance to the source of said latter signals.

4. A radio location finder for a ship or the like, comprising a plurality of directional antennae, some of said antennae being arranged with their lines of maximum receptivity angularly disposed with respect to each other and obliquely disposed with respect to the longitudinal center line of the ship, one of said antennae having its line of maximum receptivity disposed approximately at right angles to the longitudinal center line of the ship, and means responsive to the intensity of signals received by said antennae for indicating the source of said signals, the latter means comprising current meters of the rotary spindle type cooperatively associated respectively with each of said antennae, an indicating hand carried by the current meter associated with said one of said antennae, pinions mounted on the spindles of the current meters associated with said some of said antennae, racks engaging said pinions, a differential indicator, and a pin and slot connection between said racks and said differential indicator.

5. A radio location finder for a ship or the like, comprising a plurality of directional antennae, some of said antennae being arranged with their lines of maximum receptivity angularly disposed with respect to each other and obliquely disposed with respect to the longitudinal center line of the ship, one of said antennae having its line of maximum receptivity disposed approximately at right angles to the longitudinal center line of the ship, and means responsive to the intensity of signals received by said antennae for indicating the source of said signals, the latter means comprising current meters of the rotary spindle type cooperatively associated respectively with each of said antennae, an indicating hand carried by the current meter associated with said one of said antennae, pinions mounted on the spindles of the current meters associated with said some of said antennae, racks engaging said pinions, a differential indicator, and a pin and slot connection between said racks and said differential indicator, a calibration adjacent said pin and slot connection for indicating the distance of the sources of said signals.

6. A radio location finder for a ship or the like, comprising a plurality of directional antennae, one of said antennae having its line of maximum receptivity disposed approximately at right angles to the longitudinal center line of the ship, some of said antennae being arranged in pairs spaced transversely of the ship with the lines of maximum receptivity of the antennae of each pair angularly disposed with respect to each other, and means responsive to the intensity of signals received by said antennae for indicating the source of said signals, the latter means comprising current meters of the rotary spindle type cooperatively associated respectively with each of said antennae, an indicating hand carried by the current meter associated with said one of said antennae, pinions mounted on the spindles of the current meters associated with the antennae of each of said pairs of antennae, racks engaging said pinions, pinions operable by said racks, racks engaging the latter pinions, a differential indicator, and a pin and slot connection between the latter racks and said differential indicator.

7. A radio location finder for a ship or the like, comprising a plurality of directional antennae, one of said antennae having its line of maximum receptivity disposed approximately at right angles to the longitudinal center line of the ship, some of said antennae being arranged in pairs spaced transversely of the ship with the lines of maximum receptivity of the antennae of each pair angularly disposed with respect to each other, and means responsive to the intensity of signals received by said antennae for indicating the source of said signals, the latter means comprising current meters of the rotary spindle type cooperatively associated respectively with each of said antennae, an indicating hand carried by the current meter associated with said one of said antennae, pinions mounted on the spindles of the current meters associated with the antennae of each of said pairs of antennae, racks engaging said pinions, pinions operable by said racks, racks engaging the latter pinions, a differential indicator, and a pin and slot connection between the latter racks and said differential indicator, a calibration adjacent said pin and slot connection for indicating the distance of the sources of said signals.

8. A radio location finder for a ship or the like, comprising a plurality of directional antennae arranged with their lines of maximum receptivity angularly disposed with respect to each other, the combination of an indicator hand responsive to the intensity of signals received by said antennae for indicating the direction of the source of said signals, a calibration adjacent said indicator hand, and means movable over said calibration with and transversely relative to said indicator hand in response to the intensity of said signals for indicating on the direction of motion of said calibration the distance of the source of said signals.

9. A radio location finder for a ship or the like, comprising a plurality of directional antennae arranged with their lines of maximum receptivity angularly disposed with respect to each other, the combination of an indicator hand for indicating the direction of received signals, movable means for actuating said indicator hand in response to the intensity of signals received by said antennae, a calibration adjacent said indicator hand, said movable means being movable with and along and transversely relative to the direction of motion of said indicator hand and over said calibration in actuating said indicator hand so that said movable means may indicate on said calibration the distance to the source of said signals.

10. A radio location finder for a ship or the like, comprising a plurality of fixed directional antennae similarly arranged in pairs spaced transversely of the ship with the lines of maximum receptivity of the antennae of each pair angularly disposed with respect to each other so that said pairs of antennae define the extremities of one side of a triangle which may be solved for ascertaining the distance to a sending station, differential means associated with each of said pairs of antennae and responsive to the intensity of signals received thereby, and indicators associated with each of said differential means and operable thereby for indicating the source of the signals received by each of said pairs of antennae.

11. A radio location finder for a ship or the like, comprising a plurality of directional antennae, some of said antennae being arranged with their lines of maximum receptivity angularly disposed with respect to each other and obliquely disposed with respect to the longitudinal center line of the ship, one of said antennae having its line of maximum receptivity disposed approximately at right angles to the longitudinal center line of the ship, all of said antennae being fixed in the aforesaid predetermined relationship so that no adjustment thereof is necessary, a separate rotary motion producing means cooperatively associated with each of said antennae, each of said rotary means being individually responsive to the intensity of signals received by the antennae with which it is associated, indicating means responsive to the rotary means associated with said some of said antennae for giving an indication informative of the direction of the source of signals received by said some of said antennae, and other indicating means responsive solely to the rotary motion producing means associated with said one of said antennae for indicating simultaneously with the aforesaid indicating means whether signals are being received simultaneously from a plurality of stations, one of which is off the beam of the ship or from only one station off the beam, all of said indicating means being so positioned and arranged that they may be observed simultaneously from one point.

12. A radio location finder for a ship or the like, comprising a plurality of directional antennae, some of said antennae being arranged with their lines of maximum receptivity angularly disposed with respect to each other and obliquely disposed with respect to the longitudinal center line of the ship, one of said antennae having its line of maximum receptivity disposed approximately at right angles to the longitudinal center line of the ship, all of said antennae being fixed in the aforesaid predetermined relationship so that no adjustment thereof is necessary, a current meter of the rotary spindle type cooperatively associated respectively with each of said antennae, each of said current meters being individually responsive to the intensity of signals received by the antennae with which it is associated, indicating means responsive to the current meters associated with said some of said antennae for giving an indication informative to the direction of the source of signals received by said some of said antennae, and an indicating hand carried by the current meter associated with said one of said antennae for indicating simultaneously with said indicating means whether signals are being received simultaneously from a plurality of stations, one of which is off the beam of the ship or from only one station off the beam, said indicating means and said indicating hand being so positioned and arranged that they may be observed simultaneously from one point.

CARL J. RASMUSSEN.